(12) United States Patent
Riley et al.

(10) Patent No.: US 9,917,700 B2
(45) Date of Patent: Mar. 13, 2018

(54) SYSTEMS, METHODS, AND COMPUTER READABLE MEDIA FOR POLICY ENFORCEMENT CORRELATION

(75) Inventors: Yusun Kim Riley, Marlborough, MA (US); Uri Baniel, Buffalo Grove, IL (US); Peter J. Marsico, Chapel Hill, NC (US)

(73) Assignee: TEKELEC, INC., Morrisville, NC (US)

( * ) Notice: Subject to any disclaimer, the term of this patent is extended or adjusted under 35 U.S.C. 154(b) by 163 days.

(21) Appl. No.: 13/048,640

(22) Filed: Mar. 15, 2011
(Under 37 CFR 1.47)

(65) Prior Publication Data
US 2011/0225281 A1 Sep. 15, 2011

Related U.S. Application Data

(60) Provisional application No. 61/313,957, filed on Mar. 15, 2010.

(51) Int. Cl.
*G06F 15/173* (2006.01)
*H04L 12/14* (2006.01)
(Continued)

(52) U.S. Cl.
CPC .......... *H04L 12/14* (2013.01); *H04L 12/1403* (2013.01); *H04M 15/00* (2013.01); *H04M 15/66* (2013.01); *H04W 4/24* (2013.01)

(58) Field of Classification Search
CPC ...... H04L 12/1407; H04L 12/14; H04L 47/14
(Continued)

(56) References Cited

U.S. PATENT DOCUMENTS 5,901,352 A * 5/1999 St-Pierre ............... H04L 12/24
455/426.1
6,144,636 A 11/2000 Aimoto et al.
(Continued)

FOREIGN PATENT DOCUMENTS

CN 1849787 A 10/2006
CN 101217383 A 7/2008
(Continued)

OTHER PUBLICATIONS

3GPP, Policy and Charging Control Architecture, Jan. 2009, TS 23.203 version 8.4.0 Release 8.*
(Continued)

*Primary Examiner* — Liangche A Wang
*Assistant Examiner* — Sherman Lin
(74) *Attorney, Agent, or Firm* — Jenkins, Wilson, Taylor & Hunt, P.A.

(57) ABSTRACT

Systems, methods, and computer readable media for policy enforcement correlation are disclosed. According to one aspect, a method for policy enforcement correlation includes, at a policy and charging rules function (PCRF) node: receiving, from a first network node, first policy and charging related information associated with a first user of a telecommunication network; receiving, from a second network node, second policy and charging related information; correlating the first and second policy and charging related information; and, in response to correlating the first and second policy and charging information, issuing a policy and charging control (PCC)-related instruction. In one embodiment, the PCC-related instruction may be sent to the first network node, the second network node, a third network node, or some combination of the above. In one embodiment, the PCRF may receive policy and charging related information from, and may issue PCC related instructions to,
(Continued)

policy and charging enforcement functions (PCEFs), deep packet inspection (DPI) nodes, or Diameter signaling routers (DSRs).

19 Claims, 5 Drawing Sheets

(51) Int. Cl.
   *H04M 15/00* (2006.01)
   *H04W 4/24* (2018.01)
(58) Field of Classification Search
   USPC .................................................. 709/223, 224
   See application file for complete search history.

(56) References Cited

U.S. PATENT DOCUMENTS

| | | |
|---|---|---|
| 6,661,780 B2 | 12/2003 | Li |
| 6,880,005 B1 | 4/2005 | Bell et al. |
| 7,072,651 B2 | 7/2006 | Jiang et al. |
| 8,305,922 B2 | 11/2012 | Cuero |
| 8,326,263 B2 | 12/2012 | Zhou et al. |
| 8,331,229 B1* | 12/2012 | Hu et al. ................... 370/230 |
| 8,335,220 B2 | 12/2012 | Hu et al. |
| 8,353,000 B2 | 1/2013 | He et al. |
| 8,400,916 B2 | 3/2013 | Cutler et al. |
| 8,406,137 B2 | 3/2013 | Siddam et al. |
| 8,433,794 B2 | 4/2013 | Baniel et al. |
| 8,438,290 B2 | 5/2013 | Rui et al. |
| 8,458,767 B2 | 6/2013 | Riley et al. |
| 8,543,118 B1 | 9/2013 | Mangal et al. |
| 8,577,329 B2 | 11/2013 | Momtahan et al. |
| 8,595,368 B2 | 11/2013 | Baniel et al. |
| 8,601,073 B2 | 12/2013 | Craig et al. |
| 8,605,583 B2 | 12/2013 | Cutler et al. |
| 8,626,156 B2 | 1/2014 | Marsico |
| 8,630,925 B2 | 1/2014 | Bystrom et al. |
| 8,675,487 B2 | 3/2014 | Siddam et al. |
| 8,681,622 B2 | 3/2014 | Chatterjee et al. |
| 8,683,544 B2 | 3/2014 | Foottit et al. |
| 8,787,174 B2 | 7/2014 | Riley et al. |
| 8,812,020 B2 | 8/2014 | Marsico |
| 8,818,327 B2 | 8/2014 | Shaikh |
| 8,824,315 B2 | 9/2014 | Kokkinen et al. |
| 9,106,769 B2 | 8/2015 | Kanode et al. |
| 9,154,998 B2 | 10/2015 | Zhu et al. |
| 9,166,803 B2 | 10/2015 | Riley et al. |
| 9,185,510 B2 | 11/2015 | Nas |
| 9,369,910 B2 | 6/2016 | Rajagopalan et al. |
| 9,743,928 B2 | 8/2017 | Shelton, IV et al. |
| 2003/0003928 A1 | 1/2003 | Marjelund et al. |
| 2004/0116117 A1 | 6/2004 | Ahvonen et al. |
| 2005/0013423 A1 | 1/2005 | Eversen et al. |
| 2005/0064889 A1 | 3/2005 | Haumont |
| 2005/0107091 A1 | 5/2005 | Vannithamby et al. |
| 2005/0176438 A1 | 8/2005 | Li |
| 2005/0195743 A1 | 9/2005 | Rochberger et al. |
| 2006/0013191 A1 | 1/2006 | Kavanagh |
| 2007/0004393 A1 | 1/2007 | Forsberg et al. |
| 2007/0054665 A1 | 3/2007 | Elkarat et al. |
| 2007/0066286 A1 | 3/2007 | Hurtta |
| 2007/0121812 A1 | 5/2007 | Strange et al. |
| 2007/0153995 A1 | 7/2007 | Fang et al. |
| 2007/0159976 A1 | 7/2007 | Dekeyzer et al. |
| 2007/0165599 A1 | 7/2007 | Skog et al. |
| 2007/0195788 A1 | 8/2007 | Vasamsetti et al. |
| 2007/0232301 A1* | 10/2007 | Kueh .......................... 455/433 |
| 2007/0259673 A1 | 11/2007 | Willars et al. |
| 2008/0021993 A1* | 1/2008 | Compton et al. ............ 709/224 |
| 2008/0043689 A1 | 2/2008 | Walter |
| 2008/0046963 A1 | 2/2008 | Grayson et al. |
| 2008/0142599 A1 | 6/2008 | Benillouche et al. |
| 2008/0153484 A1 | 6/2008 | Boni et al. |
| 2008/0159194 A1 | 7/2008 | Westman et al. |
| 2008/0205345 A1 | 8/2008 | Sachs et al. |
| 2008/0232376 A1 | 9/2008 | Huang et al. |
| 2009/0061855 A1 | 3/2009 | Sethi et al. |
| 2009/0109845 A1 | 4/2009 | Andreasen et al. |
| 2009/0111458 A1 | 4/2009 | Fox et al. |
| 2009/0141625 A1 | 6/2009 | Ghai |
| 2009/0177650 A1 | 7/2009 | Petersson et al. |
| 2009/0185494 A1 | 7/2009 | Li et al. |
| 2009/0207730 A1 | 8/2009 | Stamoulis et al. |
| 2009/0219946 A1 | 9/2009 | Liu et al. |
| 2009/0225762 A1 | 9/2009 | Davidson et al. |
| 2009/0228956 A1 | 9/2009 | He et al. |
| 2009/0232019 A1 | 9/2009 | Gupta et al. |
| 2009/0270099 A1 | 10/2009 | Gallagher et al. |
| 2009/0325574 A1 | 12/2009 | Izawa et al. |
| 2010/0040047 A1 | 2/2010 | Zamora et al. |
| 2010/0048161 A1 | 2/2010 | He et al. |
| 2010/0080171 A1 | 4/2010 | Rune et al. |
| 2010/0091671 A1 | 4/2010 | Lidstrom et al. |
| 2010/0121960 A1 | 5/2010 | Baniel et al. |
| 2010/0142373 A1* | 6/2010 | Jin et al. .................... 370/230 |
| 2010/0189004 A1* | 7/2010 | Mirandette et al. ......... 370/252 |
| 2010/0190497 A1 | 7/2010 | Pudney et al. |
| 2010/0192170 A1 | 7/2010 | Raleigh |
| 2010/0241496 A1 | 9/2010 | Gupta et al. |
| 2010/0246500 A1 | 9/2010 | Rydnell et al. |
| 2010/0284278 A1 | 11/2010 | Alanara |
| 2010/0287121 A1 | 11/2010 | Li et al. |
| 2010/0291924 A1 | 11/2010 | Antrim et al. |
| 2010/0297985 A1 | 11/2010 | Van Erlach |
| 2010/0299451 A1 | 11/2010 | Yigang et al. |
| 2011/0067085 A1 | 3/2011 | Brouard et al. |
| 2011/0076985 A1 | 3/2011 | Chami et al. |
| 2011/0103261 A1 | 5/2011 | Duan |
| 2011/0116382 A1 | 5/2011 | McCann et al. |
| 2011/0122886 A1 | 5/2011 | Willars et al. |
| 2011/0138066 A1 | 6/2011 | Kopplin et al. |
| 2011/0165901 A1 | 7/2011 | Baniel et al. |
| 2011/0171958 A1 | 7/2011 | Hua et al. |
| 2011/0188457 A1 | 8/2011 | Shu et al. |
| 2011/0199903 A1 | 8/2011 | Cuervo |
| 2011/0217979 A1 | 9/2011 | Nas |
| 2011/0225306 A1 | 9/2011 | Delsesto et al. |
| 2011/0264803 A1* | 10/2011 | Yuen .................. H04L 12/14 709/225 |
| 2011/0299395 A1 | 12/2011 | Mariblanca Nieves |
| 2011/0307790 A1 | 12/2011 | Pandya et al. |
| 2011/0314145 A1 | 12/2011 | Raleigh et al. |
| 2011/0317557 A1 | 12/2011 | Siddam et al. |
| 2012/0008544 A1 | 1/2012 | Nakagawa et al. |
| 2012/0014332 A1 | 1/2012 | Smith et al. |
| 2012/0028626 A1 | 2/2012 | Marocchi et al. |
| 2012/0039175 A1 | 2/2012 | Sridhar et al. |
| 2012/0044867 A1 | 2/2012 | Faccin et al. |
| 2012/0052866 A1 | 3/2012 | Froehlich et al. |
| 2012/0057463 A1 | 3/2012 | Hurtta et al. |
| 2012/0087368 A1 | 4/2012 | Kunarathnam et al. |
| 2012/0096177 A1 | 4/2012 | Rasanen |
| 2012/0099438 A1 | 4/2012 | Wang et al. |
| 2012/0099529 A1 | 4/2012 | Williams |
| 2012/0099715 A1 | 4/2012 | Ravishankar et al. |
| 2012/0115478 A1 | 5/2012 | Guraratnam et al. |
| 2012/0131165 A1 | 5/2012 | Baniel et al. |
| 2012/0140632 A1 | 6/2012 | Norp et al. |
| 2012/0142311 A1 | 6/2012 | Rui et al. |
| 2012/0155389 A1 | 6/2012 | McNamee et al. |
| 2012/0176894 A1 | 7/2012 | Cai et al. |
| 2012/0203781 A1 | 8/2012 | Wakefield |
| 2012/0213072 A1 | 8/2012 | Kotecha et al. |
| 2012/0215930 A1 | 8/2012 | Stenfelt et al. |
| 2012/0221445 A1 | 8/2012 | Sharma |
| 2012/0221693 A1 | 8/2012 | Cutler et al. |
| 2012/0250573 A1 | 10/2012 | Kulasingam et al. |
| 2012/0250613 A1 | 10/2012 | Robinson et al. |
| 2012/0281617 A1 | 11/2012 | Bumiller |
| 2012/0290452 A1 | 11/2012 | Pancorbo Marcos et al. |
| 2012/0303796 A1 | 11/2012 | Mo et al. |
| 2013/0039176 A1 | 2/2013 | Kanode et al. |
| 2013/0041994 A1 | 2/2013 | Terrien et al. |

(56) References Cited

U.S. PATENT DOCUMENTS

| | | |
|---|---|---|
| 2013/0070594 A1 | 3/2013 | Garcia Martin et al. |
| 2013/0079006 A1 | 3/2013 | Cho et al. |
| 2013/0114404 A1 | 5/2013 | Yang |
| 2013/0142042 A1 | 6/2013 | Garcia Martin et al. |
| 2013/0160058 A1 | 6/2013 | Albal et al. |
| 2013/0163429 A1 | 6/2013 | Dunstan et al. |
| 2013/0177146 A1 | 7/2013 | Schneider et al. |
| 2013/0265911 A1 | 10/2013 | Kulaingam et al. |
| 2013/0279401 A1 | 10/2013 | Sander et al. |
| 2014/0011512 A1 | 1/2014 | Hu et al. |
| 2014/0018067 A1 | 1/2014 | Rajagopalan et al. |
| 2014/0022897 A1 | 1/2014 | Rajagopalan et al. |
| 2014/0031029 A1 | 1/2014 | Rajagopalan et al. |
| 2014/0040975 A1 | 2/2014 | Raleigh et al. |
| 2015/0011182 A1 | 1/2015 | Goldner et al. |

FOREIGN PATENT DOCUMENTS

| | | | |
|---|---|---|---|
| CN | 101272534 A | 9/2008 | |
| CN | 101841766 A | 9/2010 | |
| CN | 101978716 A1 | 2/2011 | |
| CN | 102215469 A | 10/2011 | |
| CN | 102223663 A | 10/2011 | |
| CN | ZL200980130515.0 | 2/2015 | |
| CN | ZL201080064945.X | 11/2015 | |
| EP | 0 857 399 B1 | 5/2004 | |
| EP | 1 501 242 A2 | 1/2005 | |
| EP | 1 551 144 A1 | 7/2005 | |
| EP | 1 988 680 A1 | 11/2008 | |
| EP | 2 093 931 A1 | 8/2009 | |
| EP | 2 403 186 A1 | 1/2012 | |
| EP | 2 555 562 A1 | 2/2013 | |
| EP | 2 289 283 B1 | 2/2014 | |
| EP | 2 520 045 B1 | 7/2015 | |
| JP | 2001-054164 A | 2/2001 | |
| JP | 2012070107 A | 4/2012 | |
| JP | 2013540380 A | 10/2013 | |
| WO | WO 2007/092573 A2 | 8/2007 | |
| WO | WO 2008/000287 A1 | 1/2008 | |
| WO | WO 2009/039204 A2 | 3/2009 | |
| WO | WO 2009049684 A1 * | 4/2009 | ............ H04W 28/16 |
| WO | WO 2009/058067 A1 | 5/2009 | |
| WO | WO 2009070179 A1 * | 6/2009 | |
| WO | WO 2009082806 A1 * | 7/2009 | |
| WO | WO 2009/149341 A2 | 12/2009 | |
| WO | WO 2011/082035 A2 | 7/2011 | |
| WO | WO 2011/120229 A1 | 10/2011 | |
| WO | WO 2012/077073 A1 | 6/2012 | |
| WO | WO 2012/083795 A1 | 6/2012 | |
| WO | WO 2013/030659 A1 | 3/2013 | |
| WO | WO 2014/014823 A1 | 1/2014 | |
| WO | WO 2014/014829 A1 | 1/2014 | |
| WO | WO 2014/015331 A1 | 1/2014 | |

OTHER PUBLICATIONS

3rd Generation Partnership Project, "Technical Specification Group Services and System Aspects; Policy Charging Control Architecture," 3GPP TS 23.203, v. 8.1.1 (Mar. 2008).
Final Office Action for U.S. Appl. No. 13/572,132 (dated Jun. 16, 2016).
Non-Final Office Action for U.S. Appl. No. 13/572,132 (dated Nov. 27, 2015).
Advisory Action Before the Filing of Appeal Brief and AFCP 2.0 Decision for U.S. Appl. No. 13/572,132 (dated Jun. 4, 2015).
Applicant-Initiated Interview Summary for U.S. Appl. No. 13/572,132 (dated Apr. 29, 2015).
Final Office Action for U.S. Appl. No. 13/572,132 (dated Mar. 11, 2015).
Non-Final Office Action for U.S. Appl. No. 13/572,132 (dated Aug. 11, 2014).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).
Final Office Action for U.S. Appl. No. 13/947,314 (dated Sep. 28, 2017).
Letter Regarding Decision to grant a Chinese Patent for Chinese Patent Application No. ZL201410643664.X (dated Sep. 18, 2017).
Letter Regarding Japanese Office Action for Japanese Patent Application No. 2015-521880 (dated Sep. 12, 2017).
Applicant Initiated Interview Summary for U.S. Appl. No. 13/947,314 (dated Aug. 30, 2017).
Communication under Rule 71(3) EPC for European Application No. 13 820 508.3 (dated Aug. 24, 2017).
Notice of Allowance and Fee(s) Due for U.S. Appl. No. 13/572,132 (dated Aug. 22, 2017).
Notification of the First Office Action for Chinese Application No. 201380037292.X (dated Aug. 18, 2017).
Notification of the First Office Action for Chinese Patent Application No. 201380037289.8 (dated Jul. 19, 2017).
Communication pursuant to Article 94(3) EPC for European Patent Application No. 13 819 665.4 (dated Jul. 5, 2017).
Letter Regarding Office Action for Japanese Patent Application No. 2015-521879 (dated Jun. 20, 2017).
Non-Final Office Action for U.S. Appl. No. 13/947,314 (dated May 16, 2017).
Notification of the First Office Action for Chinese Patent Application No. 201410643664.X (dated May 4, 2017).
Applicant-Initiated Interview Summary for U.S. Appl. No. 13/572,132 (dated May 3, 2017).
Letter Regarding Office Action for Japanese Patent Application No. 2015-521880 (dated Mar. 21, 2017).
Letter Regarding Office Action for Japanese Patent Application No. 2015-523302 (dated Mar. 14, 2017).
Office Action for Indian Patent Application No. 9339/DELNP/2010 (dated Feb. 28, 2017).
Advisory Action for U.S. Appl. No. 13/947,314 (dated Feb. 10, 2017).
Communication pursuant to Article 94(3) EPC for European Patent Application No. 13 820 508.3 (dated Feb. 9, 2017).
Non-Final Office Action for U.S. Appl. No. 13/572,132 (dated Dec. 30, 2016).
Canadian Office Action for Canadian Patent Application No. 2,730,103 (dated Dec. 13, 2016).
Final Office Action for U.S. Appl. No. 13/947,314 (dated Nov. 25, 2016).
Communication pursuant to Article 94(3) EPC for European Patent Application No. 13 820 508.3 (dated Nov. 9, 2016).
Advisory Action Before the Filing of an Appeal Brief for U.S. Appl. No. 13/572,132 (dated Sep. 22, 2016).
Non-Final Office Action for U.S. Appl. No. 13/947,314 (dated Jun. 24, 2016).
Notice of Allowance and Fee(s) Due for U.S. Appl. No. 13/942,205 (dated May 16, 2016).
Office Action for Canadian Patent Application No. 2,730,103 (dated Apr. 8, 2016).
Applicant-Initiated Interview Summary for U.S. Appl. No. 13/572,132 (dated Mar. 1, 2016).
Extended European Search Report for European Application No. 13819665.4 (dated Feb. 12, 2016).
Extended European Search Report for European Application No. 13819435.2 (dated Feb. 9, 2016).
Notice of Allowance and Fee(s) Due for U.S. Appl. No. 13/942,323 (dated Feb. 5, 2016).
Extended European Search Report for European Application No. 13820508.3 (dated Feb. 3, 2016).
Applicant-Initiated Interview Summary for U.S. Appl. No. 13/942,205 (dated Jan. 22, 2016).
Advisory Action, Applicant-Initiated Interview Summary, & AFCP 2.0 Decision for U.S. Appl. No. 13/947,314 (dated Dec. 3, 2015).
Advisory Action & AFCP 2.0 Decision for U.S. Appl. No. 13/942,323 (dated Oct. 5, 2015).
Non-Final Office Action for U.S. Appl. No. 13/942,205 (dated Sep. 14, 2015).

(56) References Cited

OTHER PUBLICATIONS

Letter Regarding Decision to Grant for Chinese Patent Application No. 201080064945.X (dated Sep. 1, 2015).
Advisory Action Before the Filing of an Appeal Brief and AFCP 2.0 Decision for U.S. Appl. No. 13/942,205 (dated Jul. 31, 2015).
Final Office Action & Applicant-Initiated Interview Summary for U.S. Appl. No. 13/947,314 (dated Jul. 16, 2015).
Notice of Allowance and Fee(s) Due & Examiner-Initiated Interview Summary for U.S. Appl. No. 13/040,020 (dated Jul. 8, 2015).
Final Office Action for U.S. Appl. No. 13/942,323 (dated Jun. 9, 2015).
Final Office Action for U.S. Appl. No. 13/942,205 (dated May 19, 2015).
Communication under Rule 71(3) EPC for European Patent Application No. 10841576.1 (dated May 7, 2015).
Applicant-Initiated Interview Summary for U.S. Appl. No. 13/040,020 (dated Apr. 28, 2015).
Communication of European Publication Number and Information on the Application of Article 67(3) EPC for European Patent Application No. 13820508.3 (dated Apr. 22, 2015).
Communication of European Publication Number and Information on the Application of Article 67(3) EPC for European Application No. 13819665.4 (dated Apr. 22, 2015).
Notification of the Second Office Action for Chinese Patent Application No. 201080064945.X (dated Apr. 22, 2015).
Notice of Allowance and Fee(s) Due and Interview Summary for U.S. Appl. No. 13/572,156 (dated Apr. 6, 2015).
Non-Final Office Action for U.S. Appl. No. 13/942,323 (dated Feb. 25, 2015).
Applicant-Initiated Interview Summary for U.S. Appl. No. 13/942,205 (dated Jan. 30, 2015).
Non-Final Office Action for U.S. Appl. No. 13/040,020 (dated Jan. 29, 2015).
Non-Final Office Action for U.S. Appl. No. 13/947,314 (dated Jan. 16, 2015).
Final Office Action for U.S. Appl. No. 13/572,156 (dated Dec. 29, 2014).
Advisory Action and Examiner-Initiated Interview Summary for U.S. Appl. No. 13/040,020 (dated Dec. 5, 2014).
Non-Final Office Action for U.S. Appl. No. 13/942,205 (dated Nov. 6, 2014).
Final Office Action for U.S. Appl. No. 13/040,020 (dated Sep. 19, 2014).
First Office Action for Chinese Application No. 201080064945.X (dated Sep. 17, 2014).
Non-Final Office Action for U.S. Appl. No. 13/572,156 (dated May 23, 2014).
European Search Report for European Patent Application No. 10841576.1 (dated May 9, 2014).
Non-Final Office Action for U.S. Appl. No. 13/040,020 (dated Apr. 21, 2014).
Applicant-Initiated Interview Summary for U.S. Appl. No. 13/040,020 (dated Mar. 20, 2014).
Notice of Allowance and Fee(s) Due for U.S. Appl. No. 12/973,228 (dated Mar. 20, 2014).
Notice of Allowance and Fee(s) Due for U.S. Appl. No. 13/251,784 (dated Feb. 12, 2014).
Final Office Action for U.S. Appl. No. 13/040,020 (dated Dec. 13, 2013).
Notification of Transmittal of the International Search Report and the Written Opinion of the International Searching Authority, or the Declaration for International Application No. PCT/US2013/050512 (dated Dec. 2, 2013).
"Policy on the Mobile: New Use Cases that Optimize Devices for the Network and Generate.Revenue," An Oracle White Paper, pp. 1-15 (Dec. 2013).
Notice of Allowance and Fee(s) Due for U.S. Appl. No. 13/330,086 (dated Nov. 6, 2013).

Notification of Transmittal of the International Search Report and the Written Opinion of the International Searching Authority, or the Declaration for International Application No. PCT/US2013/050497 (dated Oct. 29, 2013).
Notification of Transmittal of the International Search Report and the Written Opinion of the International Searching Authority, or the Declaration for International Application No. PCT/US2013/051447 (dated Oct. 28, 2013).
Non-Final Office Action for U.S. Appl. No. 12/973,228 (dated Oct. 25, 2013).
Non-Final Office Action for U.S. Appl. No. 13/251,784 (dated Oct. 10, 2013).
Advisory Action for U.S. Appl. No. 13/251,784 (dated Sep. 6, 2013).
Notice of Allowance and Fee(s) Due for U.S. Appl. No. 13/276,916 (dated Sep. 3, 2013).
Non-Final Office Action for U.S. Appl. No. 13/040,020 (dated Jul. 18, 2013).
Final Office Action for U.S. Appl. No. 13/251,784 (dated Jun. 26, 2013).
Final Office Action for U.S. Appl. No. 12/973,228 (dated Jun. 21, 2013).
"3rd Generation Partnership Project; Technical Specification Group Core Network and Terminals; Access to the 3GPP Evolved Packet Core (EPC) via non-3GPP access networks; Stage 3 (Release 12)," 3GPP TS 24.302, V12.1.0, pp. 1-68 (Jun. 2013).
Non-Final Office Action for U.S. Appl. No. 13/276,916 (dated Apr. 11, 2013).
Non-Final Office Action for U.S. Appl. No. 12/973,228 (dated Feb. 1, 2013).
Non-Final Office Action for U.S. Appl. No. 13/251,784 (dated Dec. 19, 2012).
Communication of European Publication Number and Information on the Application of Article 67(3) EPC for European Patent Application No. 10841576.1 (dated Oct. 10, 2012).
Commonly-assigned, co-pending U.S. Appl. No. 13/572,156 for "Methods, Systems, and Computer Readable Media for Congestion Management in a Diameter Signaling Network," (Unpublished, filed Aug. 10, 2012).
"Digital cellular telecommunications system (Phase 2+; Univeral Mobile Telecommunications System (UMTS); LTE: Policy and charging control architecture (3GPP TS 23.203 version 8.14.0 Release 8)," ETSI TS 123 203, pp. 1-118 (Jul. 2012).
Ye et al., "Enabling Local Breakout from eNB in LTE Networks," 2012 IEEE International Conference on Communications (ICC), pp. 6982-6986 (Jun. 10-15, 2012).
"3rd Generation Partnership Project; Technical Specification Group Services and System Aspects; Local IP Access and Selected IP Traffic Offload (LIPA-SIPTO) (Release 10)," 3GPP TR 23.829, pp. 1-43 (Oct. 2011).
Notification of Transmittal of the International Search Report and the Written Opinion of the International Searching Authority, or the Declaration for International Patent Application No. PCT/US2010/061586 (dated Sep. 26, 2011).
Tekelec et al., "Discussion paper on Usage-reporting from PCRF to OCS over Sy," 3GPP TSG SA WG2 #86, pp. 1-2 (Jul. 11-15, 2011).
3GPP, "3rd Generation Partnership Project; Technical Specification Group Services and System Aspects; Universal Geographical Area Description (GAD) (Release 10)," 3GPP TS 23.032 V10.0.0, pp. 1-29 (Mar. 2011).
"Smart Cards; Card Application Toolkit (CAT) (Release 9)," ETSI TS 102 223 V9.2.0, pp. 1-209 (Oct. 2010).
3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).
3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).

(56) References Cited

OTHER PUBLICATIONS

3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).
3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010)
3GPP, "3rd Generation Partnership Project; Technical Specification Group Core Network and Terminals; Non-Access-Stratum (NAS) Functions Related to Mobile Station (MS) in Idle Mode (Release 10)," 3GPP TS 23.122 v10.0.0, pp. 1-41 (Jun. 2010).
3GPP, "Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0, pp. 1-162 (Jun. 2010).
3GPP, "3rd Generation Partnership Project; Technical Specification Group Services and System Aspects; Telecommunication management; Charging management; Diameter charging applications (Release 9)," 3GPP TS 32.299 V9.4.0, pp. 1-149 (Jun. 2010).
Znaty, "Diameter, GPRS, (LTE + ePC = EPS), IMS, PCC and SDM," EFFORT pp. 1-229 (Part 1 of 2) (May 2010).
Znaty, "Diameter, GPRS, (LTE + ePC = EPS), IMS, PCC and SDM," EFORT pp. 230-461 (Part 2 of 2) (May 2010).
"Universal Mobile Telecommunications System (UMTS); LTE; Policy and Charging Control over Gx.Reference Point (3GPP TS 29.212 version 9.2.0 Release 9)," ETSI TS 129 212 V9.2.0, pp. 1-115 (Apr. 2010).
3GPP. "3rd Generation Partnership Project; Technical Specification Group Core Network and Terminals; Policy and Charging Control over Gx Reference Point (Release 9)," 3GPP TS 29.212 V9.2.0, pp. 1-111 (Mar. 2010).
3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).
Balbás et al., "Policy and Charging Control in the Evolved Packet System," LTE—3GPP Release 8, IEEE Communications Magazine, pp. 68-74 (Feb. 2009).
Calhoun et al., "Diameter Base Protocol," RFC 3588, pp. 1-147 (Sep. 2003).
International Standard, "Maritime Navigation and Radiocommunication Equipment and Systems—Digital Interfaces—Part 1: Single Talker and Multiple Listeners," IEC 61162-1, Second edition, pp. 1-86 (Jul. 2000).
Office Action for Canadian Application No. 2,730,103 (dated Apr. 16, 2015).
Letter Regarding Decision to grant a Chinese patent for Chinese Application No. ZL200980130515.0 (dated Dec. 2, 2014).
Notification of the Third Office Action for Chinese Application No. 200980130515.0 (dated Jun. 26, 2014).
Decision to grant a European patent pursuant to Article 97(1) EPC for European Application No. 09759499.8 (dated Jan. 23, 2014).
Second Office Action for Chinese Application No. 200980130515.0 (dated Dec. 10, 2013).
Communication Under Rule 71(3) EPC for European Patent Application No. 09759499.8 (dated Aug. 14, 2013).
Notice of Allowance and Fee(s) Due for U.S. Appl. No. 12/479,179 (dated Jul. 9, 2013).
Interview Summary for U.S. Appl. No. 12/479,179 (dated Jul. 1, 2013).
First Office Action for Chinese Patent Application No. 200980130515.0 (dated Apr. 24, 2013).
Final Office Action for U.S. Appl. No. 12/479,179 (dated Feb. 15, 2013).
Notice of Allowance and Fee(s) Due for U.S. Appl. No. 13/225,390 (dated Oct. 9, 2012).
Non-Final Official Action for U.S. Appl. No. 12/479,179 (dated Sep. 13, 2012).
European Search Report for European Patent Application No. EP 09 75 9499 (dated Sep. 12, 2012).
Applicant-Initiated Interview Summary for U.S. Appl. No. 13/225,390 (dated Aug. 13, 2012).
Non-Final Official Action for U.S. Appl. No. 13/225,390 (dated May 14, 2012).
Final Official Action for U.S. Appl. No. 12/479,179 (dated Apr. 10, 2012).
Non-Final Official Action for U.S. Appl. No. 12/479,179 (dated Aug. 2, 2011).
Restriction Requirement for U.S. Appl. No. 12/479,179 (dated Feb. 8, 2011).
Communication of European publication Number and information on the application of Article 67(3) EPC for European Application No. 09759499.8 (dated Feb. 2, 2011).
Notification of Transmittal of the International Search Report and the Written Opinion of the.International Searching Authority, or the Declaration for International Application No. PCT/US2009/046395 (dated Dec. 28, 2009).
"Chapter 1: Overview of GPRS and UMTS," Cisco GGSN release 9.0 Configuration Guide, Cisco IOS Release 12.4(22)YE, pp. 1-1-1-16 (Aug. 4, 2009).
"Introduction to Diameter," Wikipedia, pp. 1-12 (Downloaded from the Internet on May 15, 2009).
"Diameter Credit-Control Application," Wikipedia, pp. 1-7 (Downloaded from the Internet on May 13, 2009).
"Diameter (Protocol)," Wikipedia, pp. 1-8 (Downloaded from the Internet on May 13, 2009).
"File: GPRS Core Structure.phg," Wikipedia, pp. 1-3 (Downloaded from the Internet on May 13, 2009).
"GPRS Core Network," Wikipedia, pp. 1-6 (Downloaded from the Internet on May 13, 2009).
"GPRS Network Architecture," DenMasBroto, pp. 1-2 (May 28, 2008).
Agilent Technologies, "Understanding DSLAM and BRAS Access Devices," White Paper, pp. 1-15 (2006).
"GPRS Tutorial," MorganDoyle Limited, pp. 1-13 (Publication Date Unknown).
Non-Final Office Action for U.S. Appl. No. 13/947,314 (dated Dec. 14, 2017).
Decision to grant a European patent pursuant to Article 97(1) EPC for European Application No. 13819435.2 (dated Nov. 30, 2017).
Office Action for Canadian Patent Application No. 2,730,103 (dated Nov. 28, 2017).

* cited by examiner

SYSTEMS, METHODS, AND COMPUTER READABLE MEDIA FOR POLICY ENFORCEMENT CORRELATION

PRIORITY CLAIM

This application claims the benefit of U.S. Provisional Patent Application Ser. No. 61/313,957 filed Mar. 15, 2010; the disclosure of which is incorporated herein by reference in its entirety.

TECHNICAL FIELD

The subject matter described herein relates to policy enforcement in a telecommunication network. More particularly, the subject matter described herein relates to systems, methods, and computer readable media for policy enforcement correlation.

BACKGROUND

In computer networks in general and telecommunication networks in particular, the term "policy" typically refers to a collection of one or more rules that govern the behavior of devices operating within the network as well as the network traffic that these devices generate. A policy charging and rules function (PCRF) is an entity that uses network operator-defined service policies, subscription information, and other data to make policy decisions. A PCRF may aid network operators in making real-time, subscriber-specific policy decisions to provide varying levels of quality of service (QoS). As a central policy decision point for a network, a PCRF node may instruct, control, manage, or inform one or more policy enforcement points, which are entities within the network that enforce the policy decisions made by the PCRF. One entity that enforces a policy with regard to a device or its traffic is a policy and charging enforcement function, or PCEF. Another entity that enforces a policy with regard to a device or its traffic is a bearer binding and event reporting function, or BBERF.

One challenge for a PCRF node is that the PCRF node may need to communicate with and control different policy enforcement points that may be of different types and may have different capabilities.

For example, policy enforcement may be performed at different levels in the network protocol. For example, so-called layer 3-4 enforcement includes enforcing policies based on the source or destination of the message, while layer 7 or application layer enforcement involves determining the type of message or the type of application that sent the message and enforcing policies based on that information. A PCRF may receive layer 3-4 information from one type of policy enforcement point and receive layer 7 information from another type of policy enforcement point.

Furthermore, some enforcement points may be "subscriber aware", i.e., they know the identity of the subscriber associated with the device or traffic at issue, while other enforcement points may be "subscriber agnostic", i.e., they do not know the identity of the subscriber associated with the device or traffic at issue. For example, enforcement points that are involved with the process of granting users access to the network are generally subscriber aware, since they generally need to authenticate and authorize users to the network. In contrast, subscriber agnostic enforcement points may make decisions based on source or destination addresses or based on message type without concern for subscriber identity or subscriber profile. A PCRF may receive from one type of policy enforcement point information that is subscriber aware (i.e., that includes information identifying a subscriber) and receive from another type of policy enforcement point subscriber agnostic information (i.e., that does not identify a particular subscriber.)

In addition, a PCRF may communicate with nodes that are not policy enforcement points, i.e., nodes that do not enforce a policy, but that provide valuable information which the PCRF may use to make policy decisions. Yet another challenge for a PCRF is that policy enforcement points and other nodes may use different types of communications link or different communications protocols, such as Gx, Gxx, and Rx, to name a few. Thus, a PCRF may need to communicate information to and from different types of sources via different protocols.

An additional challenge for the PCRF is that the PCRF may need to correlate the information that it receives from one source with information that it receives from a second source, where the two sources are of different types, have different capabilities, use different communications protocols, have different functions (e.g., policy enforcement points versus non policy enforcement points), or perform the same function but at different levels (e.g., layer 3-4 enforcement versus layer 7 enforcement.)

Accordingly, in light of these disadvantages associated with enforcement correlation or enforcement leg binding, there exists a need for network entities, methods, and computer readable media for policy enforcement correlation.

SUMMARY

According to one aspect, a method for policy enforcement correlation includes, at a policy and charging rules function node: receiving, from a first network node, first policy and charging related information associated with a first user of a telecommunication network; receiving, from a second network node, second policy and charging related information; correlating the first and second policy and charging related information; in response to correlating the first and second policy and charging information, issuing a policy and charging control related instruction.

According to another aspect, the subject matter described herein includes a network entity for policy enforcement correlation. The network entity includes a communication interface for interfacing with a telecommunication network and includes a policy and charging rules function module. The network entity receives, from a first network node, first policy and charging related information associated with a first user of a telecommunication network. The network entity receives, from a second network node, second policy and charging related information. The network entity correlates the first and second policy and charging related information, and, in response to correlating the first and second policy and charging information, issues a policy and charging control related instruction.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for policy enforcement correlation.

Reference will now be made in detail to exemplary embodiments of the present invention, examples of which are illustrated in the accompanying drawings. Wherever possible, the same reference numbers will be used throughout the drawings to refer to the same or like parts.

Figure 1:
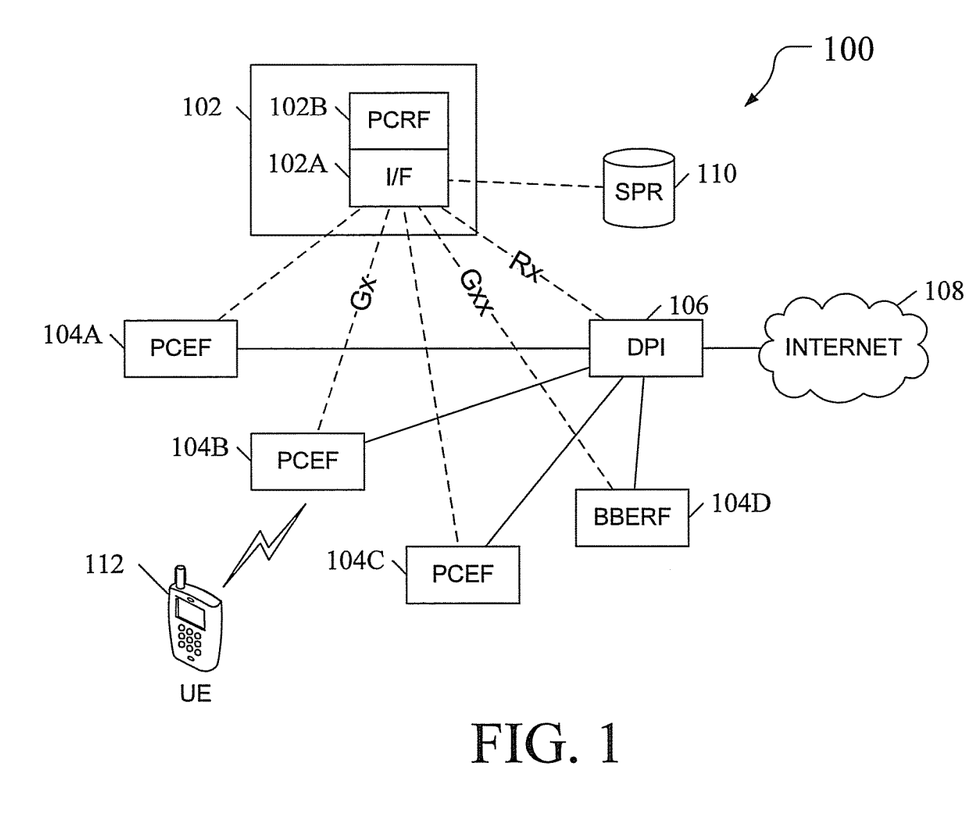
FIG. 1 is a block diagram illustrating an exemplary system for policy enforcement correlation according to an embodiment of the subject matter described herein.

FIG. 1 is a block diagram illustrating an exemplary system for policy enforcement correlation according to an embodiment of the subject matter described herein. System 100 includes a policy and charging rules function (PCRF) node 102, one or more policy enforcement points 104A~D, and a deep packet inspection (DPI) node 106. In one embodiment, PCRF node 102 includes a communications interface 102A and a PCRF module 102B.

In the embodiment illustrated in FIG. 1, PCRF 102 communicates with four distinct policy enforcement points: three policy and charging enforcement functions (PCEFs) labeled 104A, 104B, 104C, and a bearer binding and event reporting function (BBERF) 104D. Example PCEFs include, but are not limited to, a gateway GPRS support node (GGSN), a serving gateway, an access gateway, a media gateway, and a broadband remote access server (BRAS). Signaling paths are indicated by dotted lines and bearer paths are indicated by solid lines.

DPI 106 monitors all bearer traffic (also referred to as user traffic.) This is illustrated conceptually in FIG. 1 by showing that all data paths from policy enforcement points 104A~D go through DPI 106 in order to get to network 108, but in an alternative embodiment DPI 106 may remotely monitor traffic, e.g., by receiving copies of the bearer traffic, by receiving updates from monitoring nodes distributed within the network, etc. In the embodiment illustrated in FIG. 1, network 108 is an Internet protocol (IP) network, such as the Internet, but in other embodiments, network 108 may be other types of networks.

In the embodiment illustrated in FIG. 1, PCRF 102 uses a Gx interface to communicate with PCEF 104B, a Gxx interface to communicate with BBERF 104D, and an Rx interface to communicate with DPI 106. Other interfaces that may be used by PCRF 102 to communicate with nodes in system 100 include Gx-Lite, RADIUS-CoA, and Java-API.

In one embodiment, system 100 may include a subscription profile repository (SPR) 110 for storing subscriber profile information. In the embodiment illustrated in FIG. 1, PCRF 120 may communicate with SPR 110, e.g., by receiving subscriber profile information from SPR 110, sending updated status information to SRP 110, and so on. Example subscriber profile information includes, but is not limited to, an account or subscriber ID, additional identifiers for the account or subscriber, the tier or level of service that the subscriber receives, additional entitlements given to the subscriber, and state-related information, such as prepaid account balance, billing cycle, traffic volume for the month to date, text messages sent or received for the month to date, etc. For example, a subscriber profile for a mobile subscriber may include the international mobile subscriber identity (IMSI) as the account ID, the mobile station integrated services digital network number (MSISDN) or telephone number as additional subscriber identifiers, an indication that the subscriber is a basic user rather than a premium user, but with the additional entitlement that the subscriber has paid for unlimited text messaging and has purchased the option to make VoIP calls.

In the embodiment illustrated in FIG. 1, system 100 is host to a user equipment (UE) 112, which is attached to or is otherwise accessing system 100 via PCEF 104B. The collection of policy enforcement points and PCRF may be referred to as an access network. One example of an access network is an IP connectivity access network (IP CAN). An IP CAN is a network though which a user obtains a connection to an IP network. Examples of IP CAN networks include 3GPP access networks, such as GPRS or EDGE. Other examples include LTE access networks, WLAN access networks, and DSL networks. An IP CAN session is the connection of a user device to the access network for a specific purpose, such as a voice over IP telephone call, web browsing, audio or video downloading, etc. An IP CAN session is set up through signaling between the user device, e.g., UE 112, PCRF 102, subscriber profile repository 110, and the network access node, e.g., PCEF 104B.

Figure 2:
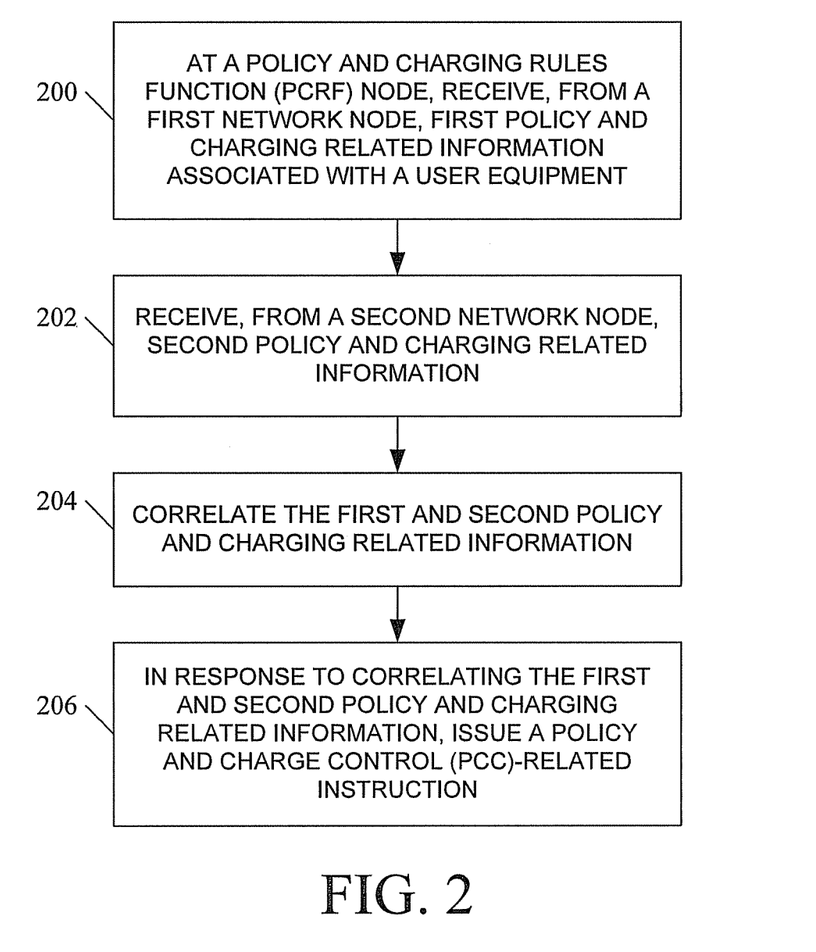
FIG. 2 is a flow chart illustrating an exemplary process for policy enforcement correlation according to an embodiment of the subject matter described herein.

FIG. 2 is a flow chart illustrating an exemplary process for policy enforcement correlation according to an embodiment of the subject matter described herein.

At block 200, a PCRF module receives, from a first network node, first policy and charging related information associated with a UE. For example, in the embodiment illustrated in FIG. 1, PCRF 102 may receive from PCEF 104B a message requesting that UE 112 be allowed access to network 100. UE 112 may be a wired device or wireless or mobile device, and may be engaged in a formal attachment process or may simply have plugged into network 100 and is attempting to make use of services of network 100.

At block 202, the PCRF module receives, from second network node, second policy and charging related information. In the embodiment illustrated in FIG. 1, for example, PCRF 102 may receive from DPI 106 a message indicating that it has detected traffic of a certain type or from a particular UE. This traffic may be from UE 112 or from another UE not shown in FIG. 1.

At block 204, the PCRF module correlates the first policy and charging related information and the second policy and charging related information, and, at block 206, in response to correlating the first and second policy and charging related information, the PCRF module issues a policy and charge control (PCC) instruction.

In one embodiment, PCRF 102 may issue the PCC-related instruction to first network node (e.g., PCEF 104), to the second network node (e.g., DPI 106), or to both. In one embodiment, the PCC-related information may be sent to the first network node, to the second network node, and/or to a third network node separate from the first and second network nodes. I.e., the PCC related information may be sent to a node or nodes different from the sources of the first and second policy related information.

PCRF 102 may need to correlate the information that it receives from one source with information that it receives from a second source, where the two sources are of different types, have different capabilities, use different communications protocols, have different functions (e.g., policy enforcement points versus non policy enforcement points), or perform the same function but at different levels (e.g., layer 3-4 enforcement versus layer 7 enforcement.)

In one embodiment, the signaling connection from PCEF 104B to PCRF 102 may be one type of protocol or interface while the signaling connection from DPI 106 to PCRF 102 may be another type of protocol or interface. In the embodiment illustrated in FIG. 1, for example, PCRF 102 communicates with PCEF 104B via a Gx interface, communicates with BBERF 104D via a Gxx interface, and communicates with DPI 106 via an Rx interface. Other possible interfaces and protocols include RADIUS, e.g., PCRF may receive a RADIUS change of authentication (RADIUS-CoA) message, Java-API, etc. In such embodiments, PCRF 102 converts or translates the messages or performs some form of normalization or standardization of the message content prior to correlation.

In one embodiment, PCRF 102 may correlate layer 3-4 policy information with layer 7 policy information. In the embodiment illustrated in FIG. 1, for example, PCEF 104B may send layer 3-4 policy information while DPI 106 may send layer 7 policy information. For example, PCEF 104B may be configured to monitor MTP routing label origination point codes (OPCs) and/or destination point codes (DPCs), SCCP calling party and called party addresses, or other layer 3-4 information, and send notification messages to PCRF 102 if certain trigger conditions are satisfied. PCEF 104B may also send messages to PCRF 102 when subscribers attempt to connect or attach to the network. These messages may include information identifying the subscriber. Example messages include a Diameter credit control request (CCR) message and a RADIUS change of authentication (CoA) message. In contrast, DPI 106 may notify PCRF 102 that it has detected a particular type of message, such as a VoIP message, that it has detected a message from a particular application, such as Skype, or other layer 7 or application layer detection/enforcement.

In an alternative embodiment, PCRF may correlate information from a policy enforcement point with information from a node that is not a policy enforcement point, or correlate information from two nodes that are not policy enforcement points. For example, a non-policy-enforcement node such as a signaling routing node may monitor through traffic and notify PCRF 102 of network activity involving a particular source or destination address or of a particular type. PCRF 102 may correlate this information with information received from PCEF 104B (a policy enforcement node) or with information received from DPI 106 operating as a detection-only (no enforcement) node.

In one embodiment, PCRF 102 may correlate information that identifies a subscriber or account with information that does not identify a particular subscriber or account. In the embodiment illustrated in FIG. 1, for example, PCEF 104B may inform PCRF 102 that a particular subscriber is attempting to access, log onto, connect to, or attach to network 100, without giving PCRF 102 any indication of what kind of traffic or how much traffic the subscriber will generate or will be likely to generate, while DPI 106 may notify PCRF 102 of detected traffic patterns, including detection of traffic from a known IP address to an as-yet-unknown IP address, and may even include the IP addresses of the parties involved, but without any knowledge of what subscribers are associated with those IP addresses and are therefore parties to the detected traffic.

Correlation can be accomplished in a variety of ways. In one embodiment, PCRF 102 receives from PCEF 104B first policy and charging information that includes the IP address of UE 112 along with some information that identifies the subscriber, such as the subscriber ID, account ID, telephone number, etc. Later, PCRF 102 may receive from DPI 106 second policy and charging information in the form of a notification that DPI 106 has detected traffic from an IP address that is as-yet-unknown to DPI 106. Because the IP address is not yet known to DPI 106, DPI 106 has no knowledge of the subscriber or account to which that IP address belongs. Likewise, if PCRF 102 receives a first session establishment request from DPI 106, this request would normally include the IP address of the user's device as a session identifier and would not include a subscriber ID or account ID. PCRF 102 may then query a database to locate the subscriber, e.g., PCRF 102 may compare the IP address provided by DPI 106 to its list of known IP addresses provided to PCRF 102 by PCEF 104B to see if any of them match. If so, PCRF 102 successfully correlates the information from DPI 106 with the information from PCEF 104B.

The PCC-related instruction that is issued by PCRF 102 in response to correlation can take a variety of forms, and can be directed to one of the sources of the correlated information or to a node that was not one of the sources of the correlated information. For example, PCRF 102 can determine that the traffic detected by DPI 106 is from a user that legitimately attached to the network via PCEF 104B. In this case, PCRF 102 may send a PCC instruction to DPI 106 such as "this user is a valid user; don't bother to notify me of any other traffic from this user." Or, if the user has exceeded a monthly data download limit, PCRF 102 may send a PCC instruction to DPI 106 such as "notify me immediately if you detect that this user is downloading streaming media."

In another example, PCRF 102 may determine that the traffic detected by DPI 106 is traffic being sent to UE 112 from a known malware site. In response, PCRF 102 may send a PCC instruction to PCEF 104B to immediately block further traffic from the known malware site to UE 112 and perhaps even put UE 112 in a probationary status, such as denying all access or all but basic call traffic, flagging the subscriber as a possible risk, etc.

The detailed operation of system 100 will now be described with reference to FIGS. 3A and 3B. For clarity, only one PCEF/BBERF will be shown, referred to in FIGS. 3A and 3B as PCEF 104.

Figure 3A:
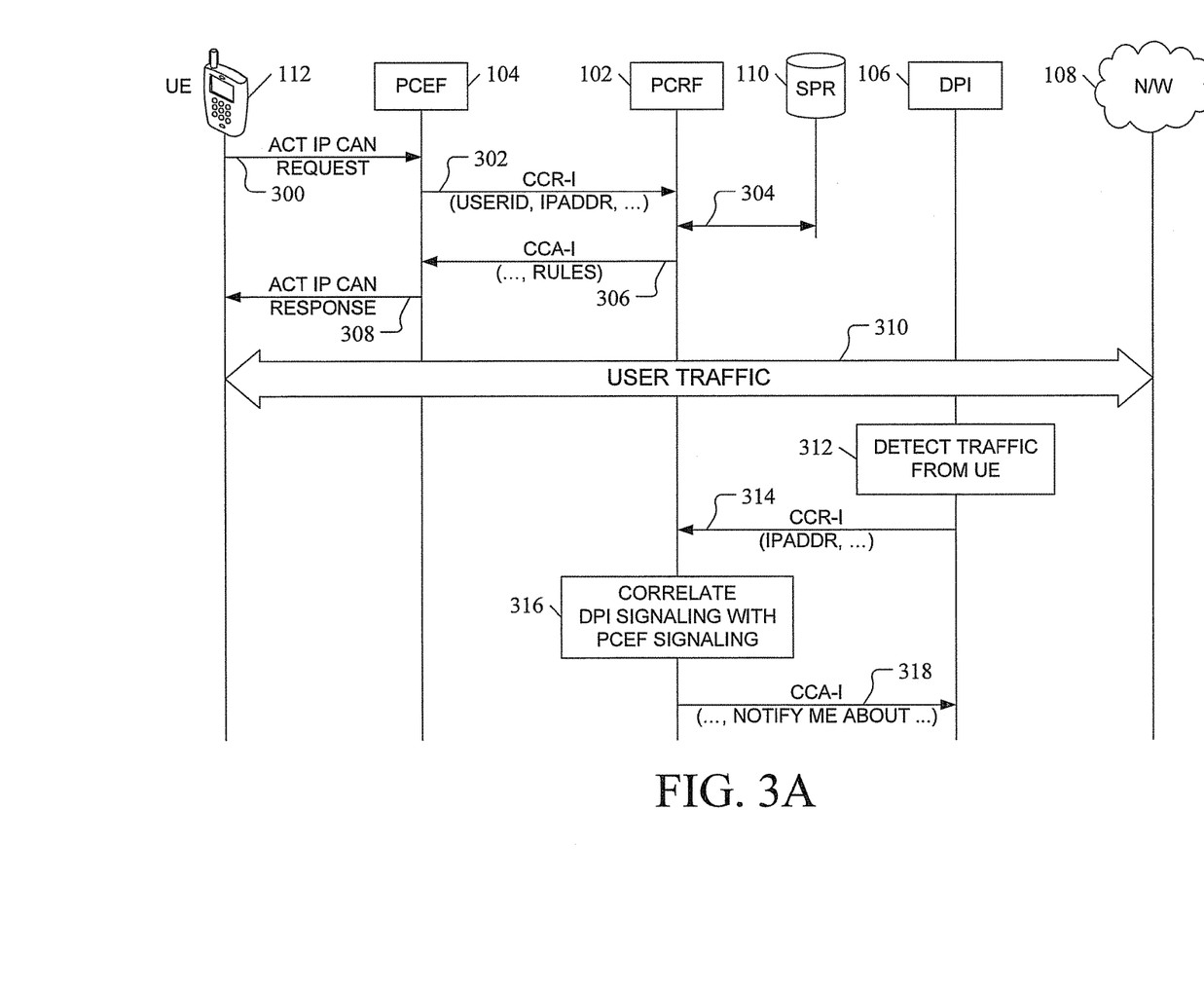
FIGS. 3A and 3B are exemplary message flow diagrams illustrating messages exchanged between components of a system for policy enforcement correlation according to an embodiment of the subject matter described herein.
Figure 3B:
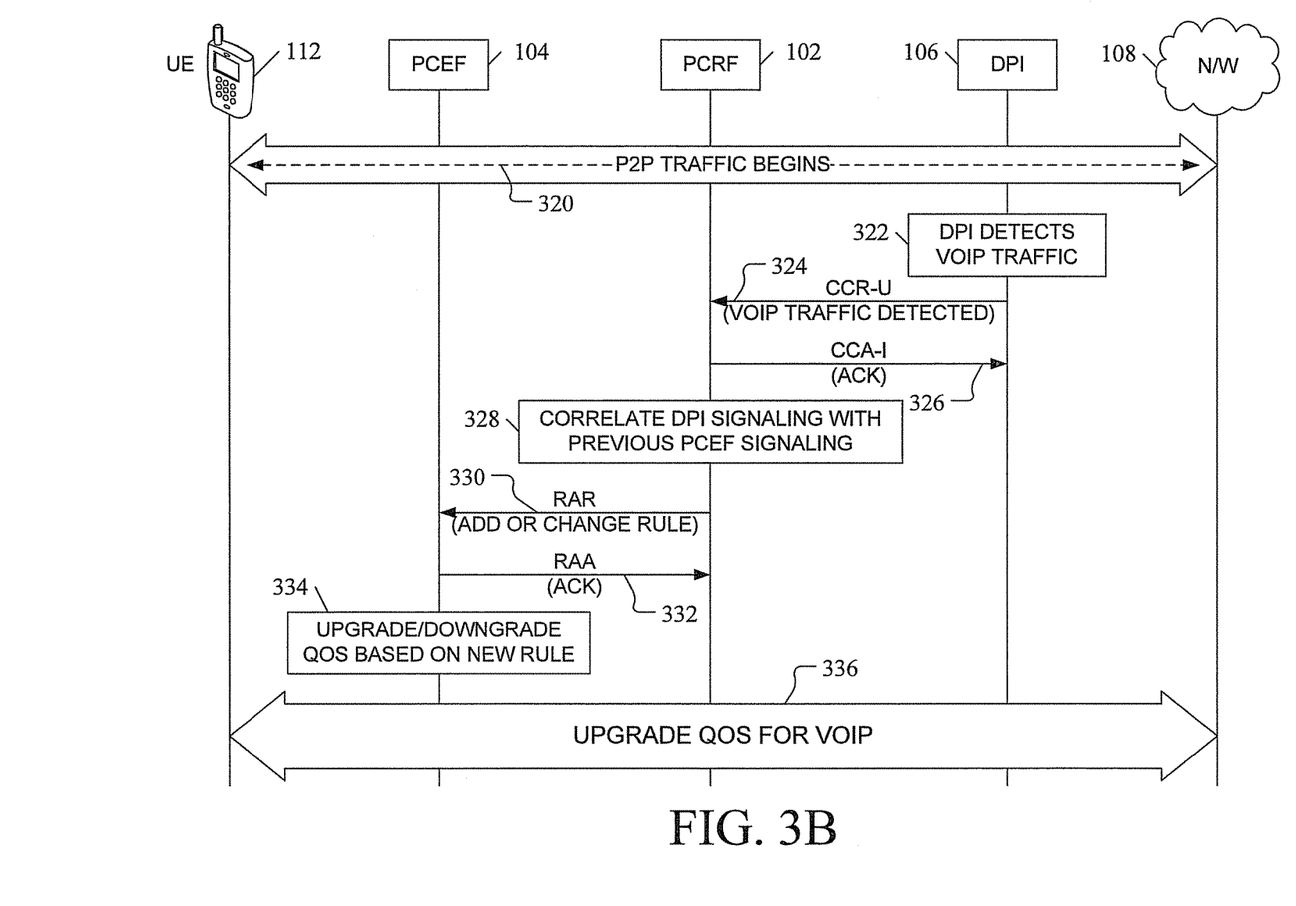

FIGS. 3A and 3B are exemplary message flow diagrams illustrating messages exchanged between components of a system for policy enforcement correlation according to an embodiment of the subject matter described herein.

In FIG. 3A, UE 112 is requesting access to system 100, for example by sending message 300 to PCEF 104. In one embodiment, message 300 is an ACT IP CAN request message sent from UE 112 to PCEF 104.

Message 302 is a message, sent from PCEF 104 to PCRF 102, that contains first policy and charging related information associated with a first user of telecommunication network 100. In one embodiment, message 302 is Diameter credit control request (CCR) message that includes a user ID for identifying a subscriber and the IP address owned by or assigned to UE 112.

In response to receiving message 302, PCRF 102 may query a subscriber profile repository SPR 110 to retrieve subscriber profile information associated with the subscriber. This interaction between PCRF 102 and SPR 110 is shown as message exchange 304. If a subscriber is found, PCRF 102 may then review that subscriber's profile, e.g., to determine whether that subscriber is allowed to send or receive that kind of traffic or whether the subscriber is allowed to communicate with the other party.

PCRF 102 may determine, based on the profile information associated with the subscriber, that certain policy and charging rules should be applied to network communications involving the subscriber, in which case PCRF 102 may send to PCEF 104 one or more policy and charging control (PCC) instructions. For example, message 306 is a Diameter credit control answer (CCA) message that includes rules that PCEF 104 should apply to the subscriber as he or she uses UE 112 to access network 110. PCEF 104 may provide PCEF 104 with a new rule to apply to communications that involve UE 112, modify an existing rule within PCEF 104 that is or should be applied to communications that involve UE 112, or instruct PCEF 104 to apply an existing rule without modification to communications that involve UE 112. PCRF 102 may also simply instruct PCEF 104 whether to allow or deny access to network 100 by UE 112.

Depending on the policy and charging rule that is applied to UE 112, PCEF 104 may either grant or deny access by UE 112 to network 100. In the embodiment illustrated in FIG. 3A, PCEF 104 sends to UE 112 an ACT IP CAN response message 308, and UE 112 is allowed to access network 100 and begins to send and receive user traffic 310.

At block 312, DPI 106, which is monitoring all traffic within network 100, detects new traffic or another PCC-related event, and informs PCRF 102 of this by sending a CCR message 314 to PCRF 102. In this manner, PCRF 102 receives second policy and charge related information. DPI 106 may notify PCRF 102 that it has detected traffic involving an as-yet unknown subscriber (e.g., UE 112).

At block 316, PCRF 102 correlates the first policy and charge related information from incoming message 302 with the second policy and charge related information from incoming message 314. In one embodiment, PCRF 102 may maintain policy and charge related information for many subscribers that are currently accessing network 100. In this scenario, PCRF 102 receives CCR message 314 but does not yet know which of the many subscribers, if any, that the incoming message applies to, in which case PCRF 102 may attempt to correlate the message just received from DPI 106 with multiple messages from multiple PCEFs one by one until a match is found.

In one embodiment, notification message 314 may identify the source and destination addresses of the user traffic. For example, message 314 may inform PCRF 102 that it has detected data being received at an IP address of a known subscriber but sent from an IP address for which no subscriber information is known. In the embodiment illustrated in FIG. 3A, message 314 includes the IP address of the traffic source, the IP address of the traffic destination, or both. In this embodiment, at block 316 PCRF 102 may use the IP address from message 314 and look for subscribers known to be using that particular IP address. If such a subscriber is found, PCRF 102 may correlate the two messages 302 and 314.

As a result of this correlation, PCRF 102 may send a policy and charge control instruction to DPI 106. In the embodiment illustrated in FIG. 3A, PCRF 102 sends a Diameter credit control answer (CCA) message 318 to DPI 106. For example, CCA message 318 may be a request to DPI 106 to notify PCRF 102 whenever a certain type of event or traffic occurs. This example process continues in FIG. 3B.

In FIG. 3B, UE 112 begins to send and receive VoIP traffic 320. For example, the subscriber may start a VoIP application, such as Skype, and use it to call a friend in another country. DPI 106 may be configured to notify PCRF 102 whenever it detects traffic of a particular type, such as voice over IP (VoIP) traffic or peer-to-peer (P2P) or file sharing application traffic. At block 322, DPI 106 detects the VoIP traffic and sends a notification message 324 containing additional policy and charging information to PCRF 102. In the example illustrated in FIG. 3B, message 324 may be a Diameter CCR update message, notifying PCRF 102 that DPI 106 has detected a VoIP session. In response to receiving message 324, PCRF 102 may send an acknowledgement message, such as Diameter CCA initial message 326 back to DPI 106.

At block 328, PCRF 102 performs a second correlation, this time to correlate the first policy and charging information in message 302 in FIG. 3A with the additional policy and charging information in message 324.

As a result of this correlation, PCRF 102 may send a policy and charge control instruction to PCEF 104. In the embodiment illustrated in FIG. 3B, PCRF 102 sends a re-authentication request (RAR) message 332 to PCEF 104. Message 332 includes an instruction to add or change a policy and charging rule with regard to the subscriber using UE 112. In one embodiment, PCEF 104 may send an acknowledge message to PCRF 102. For example, in the embodiment illustrated in FIG. 3B, PCEF 104 sends a re-authenticate answer (RAA) message 332 to PCRF 102.

As a result of the new or modified rule, PCEF 104 may make changes to some aspect of the subscriber's communications. For example, at block 334, PCEF 104 may change the quality of service (QoS) metric that is being guaranteed to the subscriber who is using UE 112. This may be an upgrade of the guaranteed QoS (e.g., if the subscriber is a premium user), but it may instead be a downgrade of the guaranteed QoS (e.g., if the subscriber's package does not support or guarantee VoIP service.) In the embodiment illustrated in FIG. 3B, PCEF 104 upgrades a QoS value for VoIP traffic, represented as a fatter data path 336. In another example, PCEF 104 may block or reduce the subscriber's access to network 100, such as when the subscriber is a pre-paid user whose account balance has fallen below a threshold value.

Other examples of PCC instructions or rule changes include charging a pay-by-the-minute subscriber more per minute for media streaming, such as video uploads or downloads, than for voice-only calls; imposing surcharges for each SMS message over a maximum allowed per month; curtailing or prohibiting calls or sessions made to entities suspected of being potentially harmful, e.g., blocking downloads from websites known to host malware, and so on.

Figure 4:
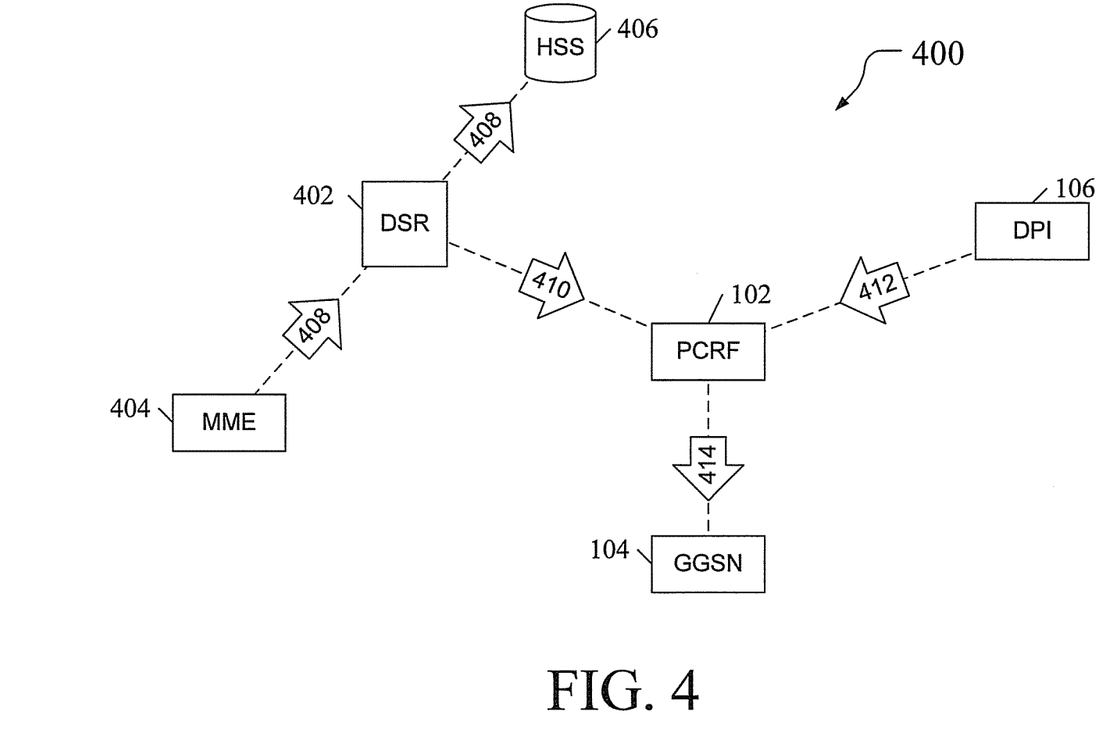
FIG. 4 is a block diagram illustrating an exemplary system for policy enforcement correlation according to another embodiment of the subject matter described herein.

FIG. 4 is a block diagram illustrating an exemplary system for policy enforcement correlation according to another embodiment of the subject matter described herein. System 400 includes a policy and charging rules function (PCRF) node 102, a policy enforcement point PCEF 104, which in the embodiment illustrated in FIG. 4 is a GGSN, and a deep packet inspection (DPI) node 106. PCRF 102, PCEF 104, and DPI 106 are essentially identical to their like-numbered counterparts in FIG. 1, and therefore their descriptions will not be repeated herein. System 400 also includes a node for routing signaling messages, such as a Diameter signaling router (DSR) 402, which routes Diameter signaling messages within system 400. In the embodiment illustrated in FIG. 4, for example, DSR 402 is on the signaling path between a mobility management entity (MME) 404 and a home subscriber server (HSS) 406.

In one embodiment, DSR 402 may monitor the signaling messages that it routes and thereby detect network activity associated with a particular subscriber. For example, in the embodiment illustrated in FIG. 4, DSR 402 may receive from MME 404 a subscriber update location request (message 408) having as its intended destination HSS 406. DSR 402 may be configured to send a notification message 410 to PCRF 102, the message containing first policy and charging related information, such as the announcement to PCRF 102 that a subscriber has joined or attached to the network. PCRF 102 may also receive second policy and charging related information in the form of message 412 from DPI 106. For example, DPI 106 may begin to detect traffic from the newly-attached subscriber. In response to receiving the first and second policy and charge-related information, PCRF 106 may correlate the two sets of information, and, in response, send a PCC related instruction to a node that is different from the source of the first policy and charge related information and different from the source of the second policy and charge related information. In the embodiment illustrated in FIG. 4, for example, PCRF 106 receives policy and charging related information from DSR 402 and DPI 106, correlates the two sets of information, and issues a PCC to a node other than DSR 402 and DPI 106, e.g., to GGSN 104. The subject matter described herein is not limited to DSRs but may be applied to other types of notes that may monitor or analyze traffic patterns and may send policy and charging related information as a result.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for policy enforcement correlation, the method comprising: at a policy and charging rules function (PCRF) node in a telecommunication network:
   receiving, from a first network node comprising a policy and charging enforcement function (PCEF) a first credit control request (CCR) message identifying a first user of the telecommunication network and an internet protocol (IP) address of the first user;
   receiving, from a second network node separate from the first network node and comprising a deep packet inspection (DPI) node, a second CCR message in response to detection, by the DPI node, of user activity on the network associated with a second user, the second CCR message comprising an IP address of the second user and indicating data being sent from the IP address of the second user for which no subscriber identity is known to the DPI node at a time of detection of the user activity;
   determining, based on the IP address of the second user, an identity of the second user of the telecommunication network from which the data is being sent;
   determining whether there is a first correlation between the first and second CCR messages using the IP address in the second CCR message received from the DPI node, wherein the correlation between the first and second CCR messages is based on a match between the IP addresses obtained from the first and second CCR messages;
   in response to determining that there is a first correlation between the first and second CCR messages, issuing, by the PCRF, a policy and charging control (PCC)-related instruction to the DPI node, the instruction comprising a request that the PCRF node be notified when the DPI node receives traffic of a particular type involving the second user;
   receiving a CCR-update (CCR-U) message from the DPI node, the CCRU message comprising additional policy and charging information configured to notify the PCRF that the DPI node has detected the traffic of the particular type;
   determining whether there is a second correlation between the first CCR message and the CCR-U message using the additional policy and charging information received from the DPI node, wherein the second correlation is based on a match between the additional policy charging information and the IP address obtained from the first CCR message, wherein the additional policy charging information does not indicate an identity of any user;
   in response to determining that there is a second correlation between the first CCR message and the CCR-U message, issuing, by the PCRF, a PCC-related instruction to the first network node comprising the PCEF for affecting a policy of the first user.

2. The method of claim 1 wherein the telecommunication network includes an access network.

3. The method of claim 1 wherein the PCC-related instruction is also issued to a node distinct from the first network node and the DPI node.

4. The method of claim 1 wherein the first network node comprises a Diameter signaling router (DSR).

5. The method of claim 1 wherein receiving the first and second CCR messages comprises receiving the first CCR message via a first interface that uses a first protocol and receiving the second CCR message comprises receiving the second CCR message via a second interface that uses a second protocol different from the first protocol.

6. The method of claim 1 wherein receiving the first CCR message comprises retrieving profile information for the first user from a subscription profile repository (SPR).

7. The method of claim 1 wherein determining whether there is a correlation between the first and second CCR messages comprises:
   determining whether the first and second users are parties in a telecommunication session.

8. The method of claim 1 wherein determining whether there is a correlation between the first and second CCR messages comprises:
   determining, based on the first and second CCR messages, that the traffic of the particular type or from a particular user has been detected; and determining whether the detected traffic is associated with the first user.

9. The method of claim 1 wherein the PCRF receives the second CCR message from the DPI node via an Rx interface.

10. A network entity for policy enforcement correlation, the network entity comprising:
a communication interface for interfacing with a telecommunication network; and
a policy and charging rules function (PCRF) module for:
receiving, from a first network node comprising a policy and charging enforcement function (PCEF), and via the communications interface, a first credit control request (CCR) message identifying a first user of the telecommunication network and an internet protocol (IP) address of the first user;
receiving, from a second network node separate from the first network node and comprising a deep packet inspection (DPI) node, a second CCR message in response to detection, by the DPI node, of user activity on the network associated with a second user, the second CCR message comprising an IP address of the second user and indicating data being sent from the IP address of the second user for which no subscriber identity is known to the DPI node at a time of detection of the user activity;
determining, based on the IP address of the second user, an identity of the second user of the telecommunication network from which the data is being sent;
determining whether there is a first correlation between the first and second CCR messages using the IP address in the second CCR message received from the DPI node, wherein the correlation between the first and second CCR messages is based on a match between the IP addresses obtained from the first and second CCR messages;
in response to determining that there is a first correlation between the first and second CCR messages, issuing, by the PCRF, a policy and charging control (PCC)-related instruction to the DPI node, the instruction comprising a request that the PCRF node be notified when the DPI node receives traffic of a particular type involving the second user;
receiving a CCR-update (CCR-U) message from the DPI node, the CCR-U message comprising additional policy and charging information configured to notify the PCRF that the DPI node has detected the traffic of the particular type;
determining whether there is a second correlation between the first CCR message and the CCR-U message using the additional policy and charging information received from the DPI node, wherein the second correlation is based on a match between the additional policy charging information and the IP address obtained from the first CCR message, wherein the additional policy charging information does not indicate an identity of any user; and
in response to determining that there is a second correlation between the first CCR message and the CCR-U message, issuing, by the PCRF, a PCC-related instruction to the first network node comprising the PCEF for affecting a policy of the first user.

11. The network entity of claim 10 wherein the telecommunication network comprises an access network.

12. The network entity of claim 10 wherein the PCC-related instruction is also issued to a node distinct from the first network node and the DPI node.

13. The network entity of claim 10 wherein the first network node comprises a Diameter signaling router (DSR).

14. The network entity of claim 10 wherein the first CCR message is received via a first interface that uses a first protocol and the second CCR message is received via a second interface that uses a second protocol different from the first protocol.

15. The network entity of claim 10 wherein receiving the first CCR message comprises retrieving profile information for the first user from a subscription profile repository (SPR).

16. The network entity of claim 10 wherein determining whether there is a correlation between the first and second CCR messages comprises:
determining whether the first and second users are parties in a telecommunication session.

17. The network entity of claim 10 wherein determining whether there is a correlation between the first and second CCR messages comprises:
determining, based on the first and second CCR messages, that the traffic of the particular type or from a particular user has been detected; and
determining whether the detected traffic is associated with the first user.

18. The network entity of claim 10 wherein the PCRF receives the second CCR message from the DPI node via an Rx interface.

19. A non-transitory computer readable medium having stored thereon executable instructions that when executed by the processor of a computer control the computer to perform steps comprising:
at a policy and charging rules function (PCRF) node in a telecommunication network:
receiving, from a first network node comprising a policy and charging enforcement function (PCEF), a first credit control request (CCR) message identifying a first user of a telecommunication network and an internet protocol (IP) address of the first user;
receiving, from a second network node separate from the first network node and comprising a deep packet inspection (DPI) node, a second CCR message in response to detection, by the DPI node, of user activity on the network associated with a second user, the second CCR message comprising an IP address of the second user indicating data being sent from the IP address of the second user for which no subscriber identity is known to the DPI node at a time of detection of the user activity;
determining, based on the IP address of the second user, an identity of the second user of the telecommunication network from which the data is being sent;
determining whether there is a first correlation between the first and second CCR messages using the IP address in the second CCR message received from the DPI node, wherein the correlation between the first and second CCR messages is based on a match between the IP addresses obtained from the first and second CCR messages;
in response to determining that there is a first correlation between the first and second CCR messages, issuing, by the PCRF, a policy and charging control (PCC)-related instruction to the DPI node, the instruction comprising a request that the PCRF node be notified when the DPI node receives traffic of a particular type involving the second user;
receiving a CCR-update (CCR-U) message from the DPI node, the CCRU message comprising additional policy and charging information configured to notify the PCRF that the DPI node has detected the traffic of the particular type;

determining whether there is a second correlation between the first CCR message and the CCR-U message using the additional policy and charging information received from the DPI node, wherein the second correlation is based on a match between the additional policy charging information and the IP address obtained from the first CCR message, wherein the additional policy charging information does not indicate the identity of any user; and in response to determining that there is a second correlation between the first CCR message and the CCR-U message, issuing, by the PCRF, a PCC-related instruction to the first network node comprising the PCEF for affecting a policy of the first user.

\* \* \* \* \*